Patented Feb. 24, 1953

2,629,731

UNITED STATES PATENT OFFICE 2,629,731

ESTERS OF PHOSPHONOFORMIC ACIDS AND POLYHYDRIC ALCOHOLS

Denham Harman, Orinda, Calif., assignor to Shell Development Company, Emeryville, Calif., a corporation of Delaware No Drawing. Application March 7, 1951, Serial No. 214,431

13 Claims. (Cl. 260—461)

This invention relates to new organic compounds of phosphorus, and it relates more particularly to new ester-derivatives of certain organophosphorus acids and to a method for their preparation.

The novel products to which this invention relates are esters of polyhydric alcohols and P-esters of the phosphonoformic acids. The new compounds that are provided by the invention also may be described as being ester-derivatives of the phosphonoformic acids in which the P-linked acid function or functions is or are combined in ester linkage with an alcohol or phenol and the C-linked acid function (the formic acid function) is combined in ester linkage with a polyhydric alcohol. Expressed still otherwise, the products of this invention are (diorgano phosphono) formates and (organo organophosphono)-formates of polyhydric alcohols, i. e., esters of phosphonoformic acids (including the secondary phosphonoformic acids, or organophosphonoformic acids) and polyhydric alcohols having the P-linked acid functions combined in ester linkage with an organic esterifying radical, such as the residue of an alcohol or a phenol.

The formula for phosphonoformic acid, an illustrative phosphonoformic acid, may be written as follows:

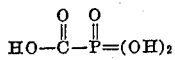

and the hydroxy groups that are bonded to the atom of phosphorus may be referred to as the P-linked acid functions and the hydroxy group that is bonded to the carbon atom may be referred to as the C-linked acid function, or the formic acid function. Other illustrative phosphonoformic acids include the sulfur-containing analogs of the compound represented by the above formula, such as phosphonothionoformic acid

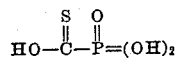

Thionophosphonothionoformic acid

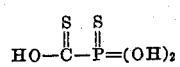

Phosphonothiolothionoformic acid

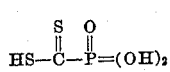

and the corresponding phosphonoformic acids that are depicted when any one or more of the oxygen atoms in the first formula is or are replaced by divalent sulfur. The phosphonoformic acids include, in addition to these primary phosphonoformic acids, the secondary phosphonoformic acids, that is, the phosphonoformic acids of the formula

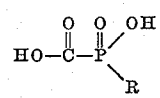

in which R represents an organic group that is bonded to the phosphorus atom by a carbon-to-phosphorus bond, and the acids that are represented when any one or more of the oxygen atoms in this formula is or are replaced by divalent sulfur.

The new phosphorus-containing esters to which this invention relates are the C-esters of such phosphonoformic acids and polyhydric alcohols, having the phosphonic acid function or functions combined in ester linkage with the organic residue of an alcohol or phenol. The class of compounds to which this invention relates generically is represented by the formula

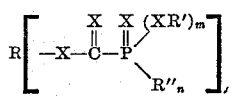

in which R represents a residue of a polyhydric alcohol denoted by $R(XH)_x$, R' represents the residue of an alcohol or phenol denoted by R'XH, each X represents an atom of oxygen or sulfur, R" represents an organic radical that is bonded to the phosphorus atom by a carbon-to-phosphorus bond, $x$ and $y$ represent small whole numbers ($y$ being not greater than $x$), and $m$ equals 1 or 2 and $n$ equals 2 minus $m$. $R(XH)_x$ may be a polyhydric alcohol containing two, three, four, or even more alcohol functions, i. e., hydroxy or mercapto groups, the value of $x$ preferably being a whole positive number of from 2 to 4 inclusive, and most desirably being 2. In the compounds represented by the above formula, the residue represented by R may be composed exclusively of atoms of carbon and hydrogen, as in the full or neutral esters ($x$ equals $y$) of unsubstituted polyhydric alcohols, or the residue represented by R may contain additionally one or more atoms of another element. Thus, R may represent, in addition to the polyvalent purely hydrocarbon groups, a hydrocarbon group that contains one or more atoms of oxygen, of sulfur, or of oxygen and sulfur, which may be present in the form of hydroxy or mercapto groups, respectively, for example, as in the partial ester of a (diorgano phosphono) formic acid and a polyhydric alcohol, e. g., glycerol mono[(dibutyl phosphono)formate], or which may be present in an ether-type linkage, for example, as in an ester of a (diorgano phosphono)formic acid and an ether- or thio-ether-alcohol, e. g., triethylene glycol bis[(dioctyl phosphono)thionoformate], thiodiglycol bis[(dioctylthio phosphono)formate] and trimethylene glycol monoethyl ether mono[(butyl benzenephosphono)formate]. Other groups and atoms which may be present as a minor part, or as a functionally non-determinant, or inert part, of the residue R include ester linkages, e. g.,

—O—OC— the keto group, —C(=O)—, halogen, amino, thiocyano, and disulfide. R' can be the residue of any alcohol or phenol, R'XH, and R'' can be any organic group the first atom of which is carbon. In addition to the purely hydrocarbon organo groups, e. g., alkyl, aryl, cycloalkyl, and the aliphatically unsaturated hydrocarbon groups, R' and R'' may be hydrocarbon groups that are substituted to a minor extent by inert substituents that do not appreciably alter the essentially hydrocarbon character of the organo group. Thus, R' and R'' may be essentially hydrocarbon groups, wherein the presence of inert or non-functional substitution, as by chloro, bromo, alkoxy, nitro, etc., that does not essentially change the hydrocarbon character of the organo radical, is not excluded. R' and R'' may be the same or they may differ from each other. When $m$ has a value of 2, the two groups represented by —XR' may be structurally the same or they may be structurally different.

The (diorgano phosphono)formates of polyhydric alcohols to which the invention relates can be prepared readily from such available ultimate raw materials as a phosphorus trihalide, e. g., phosphorus trichloride or phosphorus tribromide, an appropriate polyhydric alcohol or an ester of a polyhydric alcohol and a hydrohalogen acid, e. g., HCl or HBr, phosgene, and an alcohol or phenol, via a chloroformate ester of the polyhydric alcohol and a triester of phosphorous acid or an alkali metal salt of a diester of phosphorous acid as intermediates. A typical synthesis in which a triester of phosphorous acid is employed as the phosphorus-containing intermediate is the synthesis of diethylene glycol bis[(diethyl phosphono)formate] according to the following reactions:

1. $3C_2H_5OH + PCl_3 \rightarrow P(OC_2H_5)_3$

This reaction can be carried out by treating the alcohol with the phosphorus trihalide in the presence of a base according to well-known procedures.

2. $2COCl_2 + HO—CH_2CH_2—O—CH_2CH_2—OH \rightarrow$
$Cl—CO—O—CH_2CH_2—O—CH_2CH_2—O—CO—Cl$ This reaction is carried out by treating the polyhydric alcohol with phosgene (or with thiophosgene when it is desired to prepare a thionoformic acid derivative) according to known methods.

3.

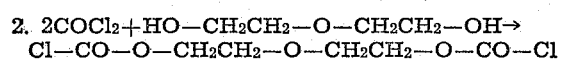

Equation 3 is illustrative of the more general reaction, by means of which haloformates of polyhydric alcohols are caused to react by the process of this invention with triesters of phosphorous acid and of thiophosphorous acids to produce in high yields (diorgano phosphono)formates of polyhydric alcohols according to the general equation

4.

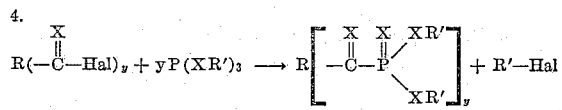

in which Hal signifies an atom of halogen, preferably bromine or chlorine, and R, R', X and $y$ have their hereinbefore-defined significance. In place of the triester of a phosphorous acid, there can be employed a diester of a phosphonous acid, with formation of an ester of a secondary phosphonoformic acid according to the following equation:

5.

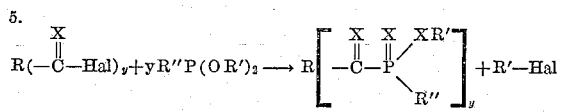

in which the indicia are the same as defined hereinbefore. A specific illustration of the reaction described in this last equation is the formation of thiodiglycol monoethyl ether mono[(butyl benzenephosphono)formate] from the chloroformate of thiodiglycol monoethyl ether and dibutyl benzene phosphonite according to the following equation:

6.

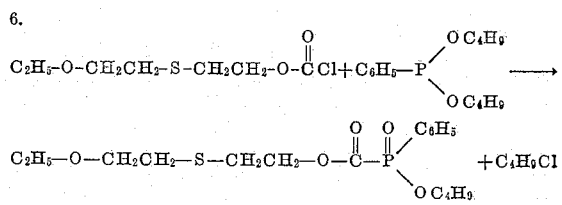

The reactions described by Equations 4 and 5 are effected by heating a mixture essentially comprising the respective reactants at a temperature sufficiently elevated to cause the desired reaction to take place, but below a temperature that would cause excessive decomposition of either reactants or product. In general, temperatures within the range of from about 80° C. to about 200° C. are employed, a preferred range being from about 100° C. to about 150° C. The optimum temperature in each case is dependent inter alia upon the particular reactants that are involved, and the temperature thus may be varied, usually within these limits, as required for optimum yields of and conversions to product. The reactants may be employed in various proportions, although it generally is preferred to use about the theoretically required amount of each reactant, that is, about the amount that is calculated from the equation for the desired reaction, or about one mole of the phosphorus-containing reactant per equivalent of chloroformate ester. The course of the reaction can be followed, for example by observation of the amount of the organic halide, R'—Hal, liberated in the reaction. Removal of the organic halide, R'—Hal, substantially as rapidly as it is formed favors completion of the reaction. Thus, the organic halide, R'—Hal, may be continuously distilled from the reaction mixture when it is sufficiently low-boiling, or it may be intermittently or continuously separated from the reaction mixture, as by treatment with selective solvents or other appropriate methods during the heating period. The reaction may be carried out at atmospheric pressure or at pressures above or below the atmospheric pressure. The reaction is non-catalytic, in the sense that added catalysts are not required for its accomplishment. Inert solvents, such as a dialkyl ether, a hydrocarbon, etc., may be included in the reaction mixture when desired

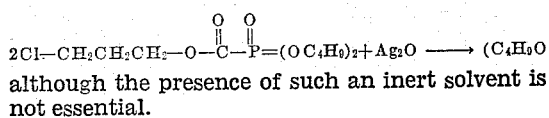

although the presence of such an inert solvent is not essential.

The reaction can be carried out in one stage or in a plurality of stages. In a single-stage process, which is generally applicable to preparation of aliphatic esters of this invention, the heating and removal of the liberated organic halide are conducted concurrently, leading directly to formation of the reaction mixture containing the desired product. In a two-stage process, the heating step and the removal of the organic halide can be carried out successively, as by first heating the reaction mixture in a closed vessel to reaction temperature, and subsequently volatilizing organic halide from the resulting mixture, with application of higher temperatures if required to effect its liberation. In either case, the desired product can be recovered from the reaction mixture by application of appropriate conventional methods, such as distillation, extraction with selective solvents, adsorption or the like. For some purposes the desired product as it exists in the reaction mixture along with minor amounts of unconverted reactants, by-products, etc., may be sufficiently pure for the use to which it is intended to be put. In such cases, separation of the desired product from the reaction mixture can, of course, be dispensed with entirely.

When there is employed an alkali metal salt of a diester of a phosphorous acid as the phosphorus-containing intermediate, the reaction may be represented, in a typical case, by the following equation for the production of pentamethylene glycol bis[(diphenyl phosphono)formate] from pentamethylene glycol bis(chloroformate) and sodium diphenyl phosphite:

7.
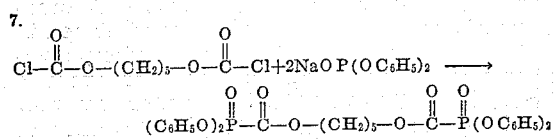

and, in the more general case, by the following equation:

8.
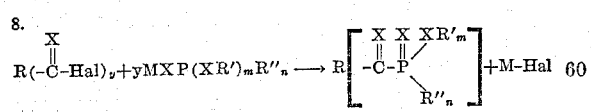

In this latter equation, M represents an atom of an alkali metal, e. g., sodium potassium, or lithium or other suitable metal, e. g., silver, and the other indicia are as hereinabove defined. The reaction represented by these equations is effected by heating a mixture of the selected reactants, preferably present in about the theoretically required proportions, to temperatures up to about 125° C., removing, for example by filtration, the metal halide, M-Hal, that is formed as by-product, and distilling or treating in other suitable manner the filtrate when it is desired to further purify the product.

While these represent preferred methods for the preparation of products of this invention, in some cases the products can be prepared by still other methods. Thus, diethylene glycol bis[(dibutyl phosphono)formate] may be prepared by condensing two molecules of 3-chloropropyl (dibutyl phosphono)formate in the presence of a metal oxide

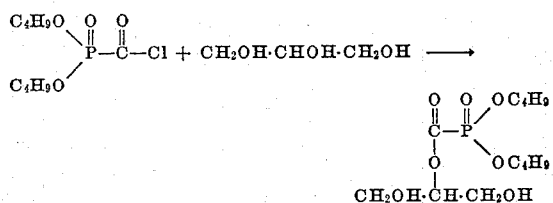

the 3-chloropropyl (dibutyl phosphono)formate being prepared in turn from 3-chloropropyl chloroformate and tributyl phosphite. There also comes into consideration the reaction between a (diorgano phosphono)formic acid halide, prepared from phosgene or thiophosgene and a diester of a phosphorous acid, and the polyhydric alcohol, e. g.:

$$\begin{array}{c}C_4H_9O\\ \phantom{C_4H_9O}\diagdown\\ \phantom{C_4H_9O}\phantom{\diagdown}P-C-Cl + CH_2OH \cdot CHOH \cdot CH_2OH \longrightarrow\\ C_4H_9O\diagup\end{array}$$

$$\begin{array}{c}O\phantom{-}O\phantom{-}OC_4H_9\\ \|\phantom{-}\|\phantom{-}\diagup\\ C-P\\ |\phantom{-}\diagdown\\ O\phantom{-}OC_4H_9\\ |\\ CH_2OH \cdot CH \cdot CH_2OH\end{array}$$

The polyhydric alcohol esters of this invention, having at least one of the alcohol functions of a polyhydric alcohol combined in ester linkage with an acid of the group consisting of (diorgano phosphono)formic acids and (organo organophosphono)formic acids include certain subclasses or subgroups of esters that, because of their distinguishing structural characteristics and their chemical and physical properties, are of particular value in technically important applications. One such subgroup of the novel compounds of the invention comprises the diesters or neutral or full esters of such (diorgano phosphono)formic acids and (organo organophosphono)formic acids with aliphatic glycols. The esters of this subgroup may be represented by the subgeneric formula:

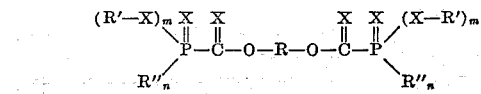

in which R'—X— is the residue of a monohydric alcohol, R'—X—H, R'' is a hydrocarbon group which may be unsubstituted or which may contain minor inert substituents that do not change the essentially hydrocarbon character of the group, X is oxygen or divalent sulfur, and R is the residue of a glycol H—O—R—O—H. R'—X can be the residue of an unsubstituted alcohol, such as of methyl, ethyl, propyl, isopropyl, butyl, isobutyl, hexyl, nonyl, dodecyl, stearyl, allyl, methallyl, vinyl, propargyl, and homologous and analogous straight-chain and branched-chain alcohols, and the corresponding thioalcohols or mercaptans. From the standpoint of ease of preparation of the products and availability of the starting materials, the preferred compounds defined by this formula are those in which R'—X— is the residue of an a tertiary essentially hydrocarbon alcohol, i. e., a primary or a secondary essentially hydrocarbon alcohol. Inert substituents which may be present include halogen, e. g., chlorine, bromine, or fluorine, nitro, alkoxy, aryloxy, and keto (—CO—), for example, as in 2,3-dichloropropyl alcohol, 2-ethoxyethanol, 3-methoxypropanol, 2,3-diphenoxypropanol, 6-ketoheptanol, 4-nitrobutanol, 2-(4- chlorophenyl) ethanol, 3 - (2,4 - dibromophenyl) - propanol, 3,3,3-trifluoropropanol and 3-acetoxypropanol. R'' can be alkyl, aryl, cycloalkyl, or an aliphatically unsaturated group, such as methyl, ethyl, propyl, butyl, octyl, phenyl, tolyl, cinnamyl, cyclohexyl, allyl, 1-propenyl, vinyl, crotyl, etc., or such a group which may contain inert minor substituents that do not change the essentially hydrocarbon character of the group.

The residue represented by R may be the residue of an unsubstituted aliphatic glycol, such as ethylene glycol, propylene glycol, trimethylene glycol, tetramethylene glycol, pentamethylene glycol, etc., or it may be the residue of a polyglycol containing a plurality of alkylene groups that are interconnected by atoms of oxygen or sulfur or amino groups, such as diethylene glycol, triethylene glycol, pentaethylene glycol, thiodiglycol, 3,6-dithiaoctanediol-1,8 1,4,7-trimethyl-3,6-dioxa - 1,8-octanediol, 3-aza-1,5-pentanediol, 5-aza-1,7-heptanediol, and 3-thia-6-aza-1,8-octanediol. By the term unsubstituted glycol it is not intended to imply a restriction to the purely straight-chain glycols. Thus, a branched carbon chain may be present in the glycols that are referred to as unsubstituted glycols. Active, or functional, substituents, such as additional hydroxy or mercapto groups, are excluded by the term "unsubstituted."

Typical compounds represented by this formula, when each X signifies an atom of oxygen, are as follows:

Ethylene glycol bis[(diallyl phosphono) formate]
Trimethylene glycol bis[(butyl benzenephosphono) formate]
Diethylene glycol bis[(dimethyl phosphono) formate]
Propylene glycol bis[(diethyl phosphono) formate]
Triethylene glycol bis[(allyl benzenephosphono) - formate]
Pentamethylene glycol bis[(dioctyl phosphono) - formate]
Thiodiglycol bis[(diphenethyl phosphono) formate]
4-thia-1,7-heptanediol bis[(octyl p-methoxybenzenephosphono) formate]
3-aza-1,5-pentanediol bis [(dibutyl phosphono) - formate]
Diethylene glycol bis(allyl 2-propenephosphono) - formate
Thiodiglycol bis[(butyl trichloromethanephosphono) formate]
3-oxa-2,4-diethyl-1,5-pentanediol bis[(3 - methoxypropyl butyl phosphono) formate]

The compounds represented by the immediately preceding formula when one or more of the atoms X= is sulfur form a still more limited group of compounds that are of particular interest from the standpoint of their usefulness as additives for lubricants, especially hydrocarbon oils as well as lubricant oils of the synthetic variety. Illustrative compounds within this more limited group include, in particular, glycol bis-[(diorgano thionophosphono) formates], such as diethylene glycol bis[(dibutyl thionophosphono) formate], trimethylene glycol bis[(dioctyl thionophosphono) formate], thiodiglycol bis[(2,3-dichloropropyl thionophosphono) formate], and triethylene glycol (diphenyl thionophosphono)-formate; glycol bis[(diorgano phosphono) thionoformates], such as diethylene glycol bis [(dibutyl phosphono) thionoformate], tetramethylenedithiol bis[(dioctyl phosphono) thionoformate], 3-aza-1,5-pentanediol bis[-bis(3,5,5-trimethylhexyl) phosphono]-thionoformate], and 4-oxa-1,7-heptanediol bis[(dihexyl phosphono) - thionoformate]; glycol bis(diorgano thionophosphono) thionoformates, such as pentamethylene glycol bis[(dibutyl thionophosphono) thionoformate], and diethylene glycol bis[(dinonyl thionophosphono) thionoformate].

Sulfur - containing - glycol (organo organo) - phosphonates of this invention that are represented by the formula include, among others, the following:

Diethylene glycol bis(ethyl benzenethionophosphono) formate
Trimethylene glycol bis(propyl butanephosphono) thionoformate
Butane-1,4-dithiol bis(isobutyl benzenethionophosphono) thionoformate, and
4-thia-1,7-heptanedithiol bis(isobutyl p-chlorobenzenephosphono) thionoformate.

Of the compounds represented by the above formula, those that contain up to 10 carbon atoms in each of the groups represented by R' and R'' and in which the group represented by R is the residue of a glycol composed of carbon, hydrogen, and at least one of sulfur and oxygen having the alcohol functions separated by a chain of from 2 to 15 atoms, i. e., having the hydroxy or mercapto groups, as the case may be, at the termini of a chain 2 to 15 atoms in length, are particularly desirable compounds.

Another subgroup of the compounds of this invention comprises esters of phosphonoformic acids, having the P-linked acid functions combined in ester linkage with a monohydric alcohol or a phenol, and polyhydric alcohols, in which the polyhydric alcohol contains more than two alcohol functions, i. e., three or more hydroxy and/or mercapto groups. Such polyhydric alcohols are represented particularly by glycerine, beta-methylglycerine, diglycerol, pentaerythritol, mannitol, sorbitol, 1,2,5 - pentanetriol, and the analogous mercapto compounds. The esters may be partial esters, i. e., less than all of the alcohol functions may be combined in ester linkage with the P-esterified phosphonoformic acid, or the degree of esterification may be complete. In the esters in which less than all of the alcoholic functions of the polyhydric alcohol are combined in ester linkage with the P-esterified phosphonoformic acid, the remaining alcohol functions may be free, i. e., HO— or HS— groups, or they may be combined in whole or in part in ether or ester linkage with an alcohol or phenol or with an inorganic or a different organic acid, respectively. Illustrative of such partial esters that are included by this invention are, among others, the following:

2-ethoxy-1,3-propanediol bis[(dibutyl phosphono) formate], or glycerol beta-ethyl monoether bis[(dibutyl phosphono) formate],
Diglycerol mono [(octyl benzenephosphono) formate],
2,3-carbonyldioxypropyl (dioctyl thionophosphono) formate,
2,3-dichloropropyl (butyl benzenephosphono) formate,
Pentaerythritol mono[(dinonyl phosphono) thionoformate],
2-propionoxy-1,3-propanediol (dibutyl phosphono) formate, and
2,3-diallyloxypropyl (ethyl p-methoxybenzenephosphono) formate, and
Glycerol tris[(dibutyl phosphono) formate].

The polyhydric alcohol esters of (organo or organophosphono)formic acids and (diorgano phosphono)formic acids that are provided by the present invention range in consistency from viscous liquids to waxy and to hard solids. The normally liquid compounds of this invention include novel esters that, because of their high viscosity indices, their stability under oxidizing conditions, i. e., at moderately elevated temperatures and in the presence of air, their low corrosivity towards widely used materials of construction, e. g., copper, aluminum, and etc., and their fluidity at low temperatures, are of outstanding value as synthetic lubricants, as hydraulic fluids, and in like applications where it is desired to have a material characterized by such properties. In such uses, the novel esters of the invention may be used neat, i. e., without additives or diluent, or they may be employed in conjunction with diluents, additives, or the like. When highly diluted with an oil, e. g., a hydrocarbon lubricating oil or a synthetic oil, e. g., a dibasic ester, such as a neutral sebacic acid ester of the type of dialkyl sebacate, or a polyoxy material, such as an alkylene oxide polymer, other compounds of the invention advantageously modify the properties of the oil, especially by imparting improved extreme pressure properties thereto. Thus, the esters of this invention can be diluted by admixture with a hydrocarbon or other lubricant, to a concentration of as low as 0.2% by weight of the ester based on the total composition, and preferably from about 0.5 to about 4% by weight, and enhanced extreme pressure properties are thereby imparted to the oil. Such compositions may have additives of customary types included in addition, e. g., anti-corrosion agents, detergents, antioxidants, thickeners to impart the characteristics of a grease to the composition, and the like. In addition to their utility as and in lubricants, hydraulic fluids, and allied compositions, the compounds of this invention can be employed as textile assistants, as plasticizers, as thread lubricants, and as flame retardants in the treatment of paper, cloth, and other normally flammable felted and woven fabrics.

The following examples will serve to illustrate certain of the various specific embodiments of the invention. It will be understood that the examples are presented with the intent of illustrating rather than of limiting the invention as it is defined in the hereto appended claims.

Example 1.—Diethylene glycol bis[(di-n-butyl phosphono)formate].—Diethylene glycol bis(chloroformate) is prepared by reaction between diethylene glycol and phosgene according to the procedure described in Example IV of U. S. Patent No. 2,476,637, to Strain and Newton. To 406 parts by weight of the purified diethylene glycol bis(chloroformate) there are added 1200 parts by weight of tri-n-butyl phosphite (prepared from n-butanol and PCl₃) and the mixture is heated under an atmosphere of nitrogen gas for 48 hours at 115° C. to 125° C. The resulting mixture is subjected to a topping treatment by heating to 207° C. under a pressure of 1 millimeter of mercury to remove lower-boiling volatile materials. The remaining almost colorless liquid, obtained in the amount of about 930 parts by weight, represents a 96.5% yield of diethylene glycol bis[(di-n-butyl phosphono)formate]. Analyses: Found, 48.3% C; 8.1% H; 11.2% P; calculated for $C_{22}H_{44}P_2O_{11}$, 48.3% C; 8.05% H; 11.35% P. Molecular weight: Found (cryoscopically in benzene) 544; calculated, 546. The structure of diethylene glycol bis[(di-n-butyl phosphono)formate] can be represented by the following formula:

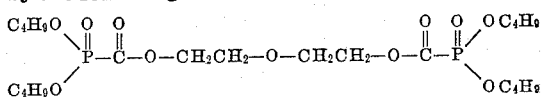

The diethylene glycol bis[(di-n-butyl phosphono)formate] thus prepared is a light oil having a viscosity slightly lower than that of an SAE 10 lubricating oil and having a viscosity index of 141.

Example 2.—Diethylene glycol bis[(di-n-butyl phosphono)thionoformate].—When diethylene glycol bis(chlorothionoformate), prepared by reaction between diethylene glycol and an excess of thiophosgene, is substituted for the diethylene glycol bis(chloroformate) that is used in the preceding example, the product is diethylene glycol bis[(di-n-butyl phosphono)thionoformate], having a structure that may be represented as follows:

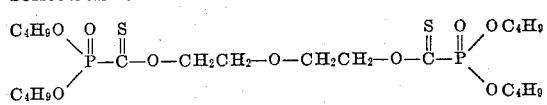

Example 3.—Pentamethylene glycol bis[(methyl benzenephosphono)formate].—Pentamethylene glycol bis(chloroformate) is prepared from pentamethylene glycol and phosgene in a manner similar to that used in Example 1. The pentamethylene glycol bis(chloroformate) is mixed with about three moles of dimethyl benzenephosphonite and the resulting mixture is heated at about 110° C. until evolution of methyl chloride substantially ceases. The mixture then is heated under about 1 millimeter mercury pressure to about 100° C. to remove lower boiling materials. The formula for the product, pentamethylene glycol bis[(methyl benzenephosphono)formate] can be represented by the following formula:

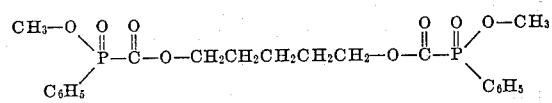

Example 4.—Dithioglycol bis[(isobutylthio benzenethionophosphono)thionoformate]. — Diisobutyl benzenedithiophosphonite and thioglycol bis(chlorothionoformate), which can be prepared from dithioglycol and thiophosgene, are mixed in a molar ratio of 3:1 and the mixture is heated under an atmosphere of nitrogen gas at 110° C. to 150° C. until evolution of isobutyl chloride substantially ceases. The resulting mixture is then heated at about 160° C. under 1 millimeter mercury pressure to remove unreacted diisobutyl benzenedithiophosphonite and other lower boiling materials, leaving a residue containing dithioglycol bis[(isobutylthio benzenethionophosphono)thionoformate]. The structure of this compound can be represented by the formula:

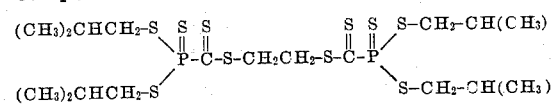

Example 5.—Triethylene glycol bis[(di-2-methoxyethyl phosphono)formate].—A mixture of 768 parts by weight of tris(2-methoxyethyl) phosphite and 227 parts by weight of triethylene glycol bis(chloroformate) is prepared and heated at 110° C. to 150° C. for 12 hours under an atmosphere of nitrogen gas, and then heated at about 160° C. under a pressure of 1 millimeter of mercury to remove lower boiling materials. The resulting product contains in good yield triethylene glycol bis[(di-2-methoxymethyl phosphono)formate], the structure of which can be represented by the formula:

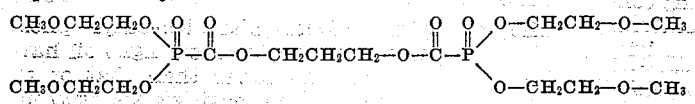

Example 6.—Thiodiglycol bis[(dioctyl phosphono)formate].— Thiodiglycol bis(chloroformate), prepared from thiodiglycol and phosgene, and trioctyl phosphite are substituted for the diethylene glycol bis(chloroformate) and tri-n-butyl phosphite, respectively, that were employed in Example 1. The resulting product, thiodiglycol bis[(dioctyl phosphono)formate], has a structure that may be represented by the formula:

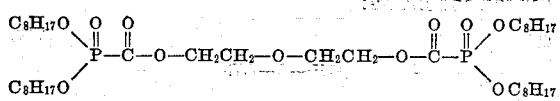

Example 7.—Glycerol alpha,beta-diethyl ether (dibutyl phosphono)formate.—Glycerol alpha, beta-diethyl ether chloroformate is prepared by treating glycerol alpha,beta-diethyl ether with phosgene at about 25° C. while maintaining the phosgene present in about three-fold excess during the reaction. The purified chloroformate and the theoretical proportion of tributyl phosphite are heated together at about 140° C. until evolution of butyl chloride substantially ceases. The resulting mixture then is topped by heating at about 150° C. under a pressure of 5 millimeters mercury, leaving as the product a higher boiling fraction consisting essentially of glycerol alpha,beta-diethyl ether (dibutyl phosphono)-formate. The structure of this ester, in which two of the alcohol functions of the polyhydric alcohol are combined in ether linkage and the third is combined in ester linkage with a (diorgano phosphono)formic acid, may be represented as follows:

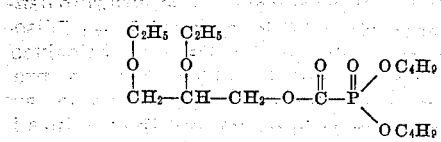

As used in the present specification and claims, the unqualified generic expressions "alcohol" and "glycol" are intended to refer to the thioalcohols and thioglycols, respectively, wherein there is present an HS— alcohol function, as well as to the "oxyalcohol" and "oxyglycol" are regarded as being restricted to the exclusively oxyalcohols and oxyglycols, i. e., to alcohols and glycols, respectively, that contain HO— or the hydroxyl group as the only type of alcohol function. The expressions "thioalcohol" and "thioglycol" refer to alcohols and glycols, respectively, that contain the HS— or thioalcohol group. "Polyhydric" is used as an adjective to denote that the alcohol contains a plurality of alcohol functions, or HS— and/or HO— groups, in the molecule.

Cross reference is hereby made to copending application Serial No. 214,432, filed of even date herewith, wherein lubricating oil compositions containing products of this invention are described and claimed.

I claim as my invention:

1. A compound having a structure represented by the formula

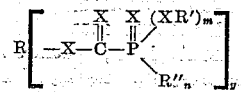

in which R represents the residue R of a polyhydric alcohol denoted by $R(XH)_x$, R'X— represents the residue of a member of the class denoted by RXH and consisting of alcohols and phenols, R" represents an organic radical that is bonded to the phosphorus atom by a carbon-to-phosphorus bond, and X represents a member of the class consisting of oxygen and sulfur, when $x$ and $y$ represent small whole positive numbers, $y$ being not greater than $x$, and $m$ is a small whole positive number not greater than 2 and $n=2-m$.

2. An ester of a glycol, in said glycol the alcohol functions being at the termini of a chain 2 to 15 atoms in length, and a (diorgano phosphono)formic acid in which each of the organo groups contains from 1 to 10 carbon atoms.

3. Glycerol alpha,beta-dialkyl ether (dialkyl phosphono)formate.

4. Thiodiglycol bis[(dioctyl phosphono)formate].

5. Diethylene glycol bis[(di-n-butyl phosphono)formate].

6. Diethylene glycol bis[(diorgano phosphono)-formate].

7. A (diorgano phosphono)formate of a polyhydric alcohol.

8. An (organo organophosphono)formate of a polyhydric alcohol.

9. An ester of a thioglycol and a primary phosphonoformic acid having the P-linked acid functions combined in ester linkage with a monohydric aliphatic alcohol.

10. A glycol bis[(organo organophosphono)-formate].

11. A glycol bis[(diorgano thionophosphono)-formate].

12. A glycol bis[(diorgano phosphono)formate].

13. Pentamethylene glycol bis[(methyl benzenephosphono)formate].

DENHAM HARMAN.

REFERENCES CITED

The following references are of record in the file of this patent:

Nylen, Ber. Deut. Chem., vol. 57, page 1035 (1924) (entire article, pages 1023 to 1038).

Chemical Abstracts, vol. 35, column 2474 (1941); citing Razumov, Trans. Kirov. Inst. Chem. Tech. Kazan No. 8, pages 45 to 47 (1940).